United States Patent [19]

Brester

[11] Patent Number: 4,623,115
[45] Date of Patent: Nov. 18, 1986

[54] PRESET MIRROR MOUNT

[75] Inventor: Robert R. Brester, New Berlin, Wis.

[73] Assignee: Velvac, Inc., New Berlin, Wis.

[21] Appl. No.: 796,769

[22] Filed: Nov. 12, 1985

[51] Int. Cl.$^4$ .............................................. A47G 1/24
[52] U.S. Cl. ................................ 248/479; 248/289.1;
248/477; 248/900
[58] Field of Search ............... 248/479, 480, 485, 486,
248/487, 289.1, 291, 284, 282, 283, 278, 900,
477; 403/120, 121; 16/327, 328, 329

[56] References Cited

U.S. PATENT DOCUMENTS

| | | | |
|---|---|---|---|
| 463,622 | 11/1891 | Drury et al. | 403/120 |
| 632,329 | 9/1899 | Teakle | 16/327 |
| 1,207,270 | 12/1916 | Braithwaite | 16/329 |
| 2,602,622 | 7/1952 | Smith | 248/293 |
| 3,730,474 | 5/1973 | Bowers | 248/900 X |
| 4,077,597 | 3/1978 | Greig | 248/479 X |
| 4,523,735 | 6/1985 | Beck et al. | 248/479 X |

Primary Examiner—J. Franklin Foss
Attorney, Agent, or Firm—Bayard H. Michael

[57] ABSTRACT

The rear view mirror bracket support incorporates multiple detent positions. The inverted cup-like cover has opposed pairs of grooves inside the side walls of the cover. A moving bracket has one end fixed to the cover and carries the mirror. A molded spring member having arcuate, radially flexible, spring arms engageable with the grooves is connected to a fixed bracket through a retainer. The retainer and the spring have serrations which are engageable to prevent relative rotation between the spring and the retainer when a bolt passing through the cover and the spring member and the retainer is tightened. When the bolt is loosened the spring member can be moved relative to the retainer to set the initial operative detent position. Now the moving bracket can be moved to any one of a number of additional detented positions or can be moved to any intermediate position which will not be detented.

6 Claims, 5 Drawing Figures

PRESET MIRROR MOUNT

BACKGROUND OF THE INVENTION

The support brackets for rear view mirrors on trucks are designed to swing back on impact or to reduce the overall vehicle width when parking in narrow spaces or going through car washes, etc. It is desireable to have the in-use position detented so the mirror can be moved back to its original position without requiring readjustment. The present designs have a tendency to scratch painted parts which then rust. They also tend to slip when used with stainless steel.

This invention is directed to provision of a preset construction which overcomes the problems of the art and provides a superior preset function. The design not only detents the bracket at its normal position but also at positions to which it can be moved (by impact or manually). Thus, the bracket can be held in a folded detented position.

SUMMARY OF THE INVENTION

This invention provides a rear view mirror support having adjustable detented positions. The construction utilizes a fixed bracket and a retainer nonrotatably connected to the bracket. A cover is nonrotatably connected to a movable bracket. The cover has a depending skirt and a spring arrangement under the cover has a radially yieldable connection with the inside of the skirt. Means are provided for adjustably fixing the spring relative to the retainer for setting the initial adjusted position of the mirror. The spring is disconnected from the retainer to permit re-adjustment of the assembly.

A further feature of the invention is the provision of a plurality of axial grooves angularly spaced on the inside of the skirt. The grooves are engaged by the springs and determine the detented positions of the assembly.

A further feature is that the grooves are diametrically opposed pairs and the spring means has two diametrically opposed groove engaging arms so the forces are balanced.

DETAILED DESCRIPTION OF THE DRAWINGS

Figure 1:
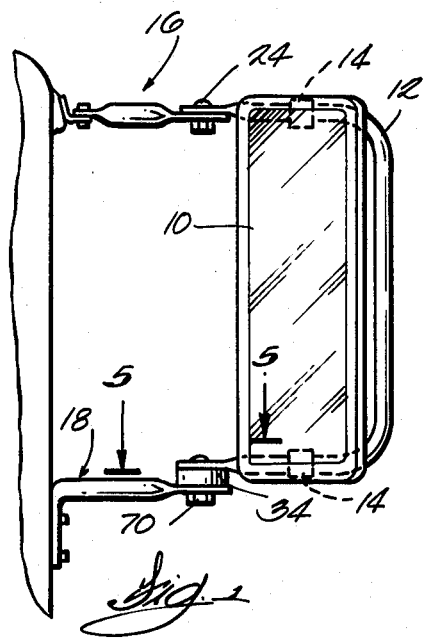
FIG. 1 is a rear elevation of the bracket mounted on the side of a truck cab.
Figure 2:
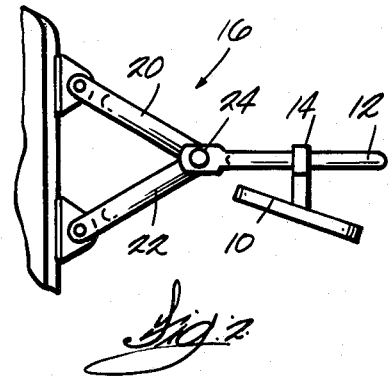
FIG. 2 is a top plan view of the bracket mounted on the truck cab.
Figure 3:
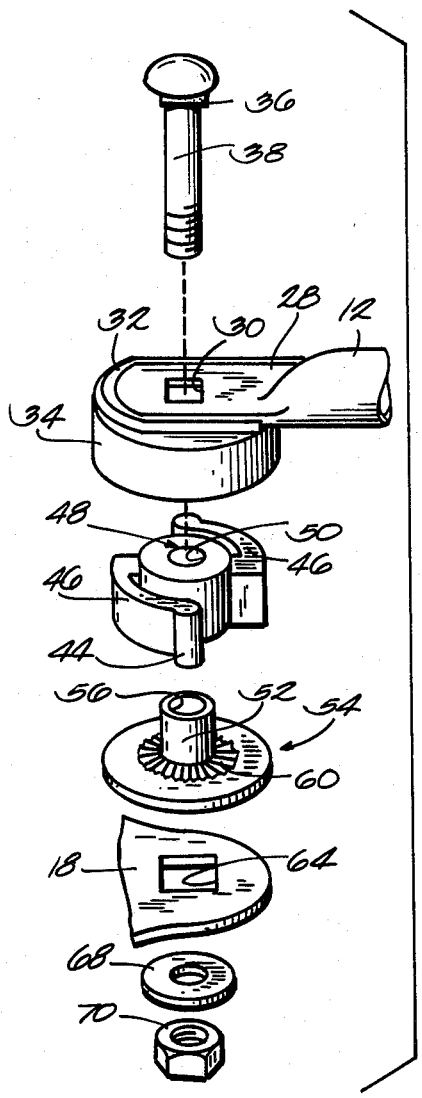
FIG. 3 is an exploded perspective view taken from above.

The mirror 10 is fixed on the U-shaped bracket 12 by supports 14. The bracket is pivotally connected to the upper and lower fixed brackets 16, 18. The upper support 16 has two arms 20, 22 each of which is connected by suitable adapters to the top edge of the door of the cab of the truck. The arms are connected to each other. The lower support is of similar construction. The swinging bracket 12 is connected to the arms by means of a bolt 24 which is not drawn up so tight as to preclude pivoting action.

The end of the lower portion of the bracket is flattened at 28 and has a square hole 30 therein. The flattened end 28 is received inside the raised wall 32 which is integral with the molded, inverted, cup-like cover 34. The square portion 36 of the mounting bolt 38 fits inside the square opening 30 in the bracket 12. This fixes the bolt against rotation relative to the bracket and the bracket is fixed relative to the cover 34 by reason of its reception in the U-shaped wall 32.

The skirt of the cover 34 is provided with equally spaced grooves 40 which extend the full length of the inside wall 42 of the skirt. There are eight such grooves and they are spaced at 45° about the axis of the cover (a 30° spacing may be more desireable but gets confusing in the drawing). The cover is molded plastic and the radius of each groove 40 is such to provide a camming surface which will also function as a detent surface receiving the semi-cylindrical ends 44 of the arcuate spring arms 46 molded integrally with the plastic spring member 48 which has a hub with central aperture 50 which will receive the hub 52 of retainer 54. The retainer hub 52 has a central aperture 56 big enough to receive the bolt 38.

Figure 4:
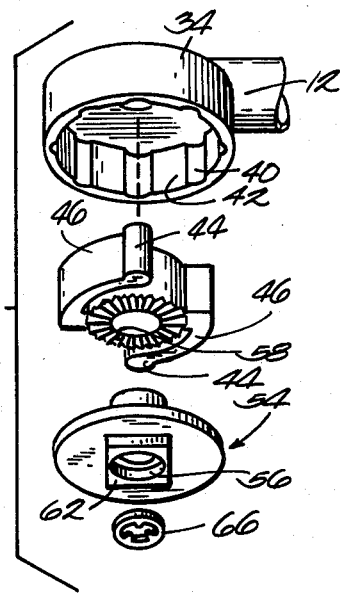
FIG. 4 is a comparable exploded view taken from below the parts.

The underside of spring member 48 is serrated at 58 to mate with the serrations 60 on the upper surface of the retainer 54. As can be seen in FIG. 4, the underside of the retainer 54 is provided with a square boss 62 which is received in the square opening 64 in the stationary mounting bracket 18 to fix the retainer 54 relative to the mounting bracket 18.

The bolt 38 will pass through the entire assembly, i.e., it will pass through the bracket end 28 and cover 34, through the central opening 56 in the retainer hub 52 and then through bracket 18. When assembled in the factory, the parts are retained in assembled position by Tinnerman washer 66 on the lower end of the bolt 38. When the parts are mounted onto the mounting bracket of the truck the Tinnerman washer is removed and flat washer 68 is placed on the end of the bolt 38 and nut 70 is then tightened. It is not tightened all the way until the bracket 12 and mirror are in the desired position relative to the truck driver. Then the nut 70 is drawn up tight and this mates the serrations 58 and 60 on the spring and retainer to lock the spring relative to the retainer. The spring is already fixed relative to the cup by reason of engagement of the semi-cylindrical ends 44 with a selected pair of opposed slots 40 in the inside wall of the cup 34.

When the nut 70 is tight, the serrations on the retainer and spring member act to fix the spring in position and this in turn fixes the cup. The angle of the cup or the mounting bracket relative to the truck or the stationary bracket makes no difference. The adjustment is obtained with the serrations. If it is desired to change the adjusted position of the mirror, the nut 70 is backed off to let the serrations separate. Then the parts can be moved to a new position and the nut tightened to fix the new relationship. It will be apparent that when the bracket is pivoted rearwardly, the cup rotates about the axis of the bolt relative to the spring arms. The bracket can be stopped in any desired position or it can be detented in 45° increments. This then would result in the bracket being held in a folded-back position until the movable bracket and mirror are moved back to the normal position.

The cup, spring and retainer are all made out of a glass-filled plastic having considerable strength. The plastic doesn't rust. There are no lock washers or the like to dig into the paint of the brackets and, as a result, rust is virtually eliminated.

The cover or inverted cup 34 is fixed relative to the bracket 12 by the flattened end of the bracket fitting inside the raised wall. The retainer 54 is fixed relative to the stationary bracket 18 by reason of the engagement of the square boss 62 with the hole 64 in the bracket 18. When the bracket 12 is moved to adjust the mirror position, the nut 70 is backed off enough so the serrations 58 and 60 will not engage. When the nut 70 is tightened to hold bracket 12 in its adjusted position the serrations engage and the spring is fixed relative to the stationary bracket. When the moving bracket 12 is moved the spring arm 46 will be forced inwardly to permit such movement. The moving bracket can stop at any position and has detented positions every 45°.

Figure 5:
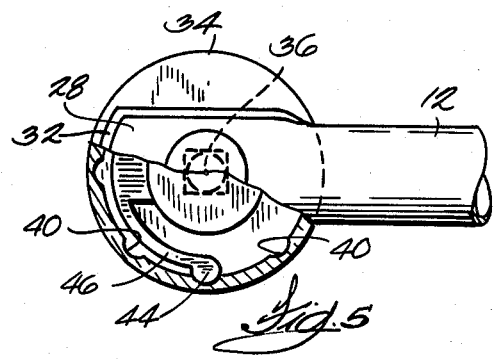
FIG. 5 is a section taken on the meandering line 5—5 in FIG. 1.

The initial position of the cover and spring relative to the side of the vehicle has no bearing on the normal position or the other detented positions of the bracket. Thus, while FIG. 5 shows the end 44 of spring 46 engaging a groove 40 at the "6 o'clock" position, the point of engagement could be anywhere and still provide the proper lock up for the in-use position and also provide for detented positions at 45° increments from the normal position.

At the start of the adjusting process, the spring arms should be engaged with the grooves in the cup. When the moving bracket and the retainer 54 are moved without engaging the serrations there is complete freedom of movement. When the nut is tightened it engages the serrations to fix the retainer and the spring member for joint movement instead of independent movement. When the moving bracket moves thereafter the retainer 54 and the spring member move about the axis of the bolt and the springs are forced to deflect inwardly as the spring moves out of its detent postion. Since the spring arms engage opposed grooves the forces are balanced and the action is quite smooth.

I claim:

1. A rear view mirror support having adjustable detented positions, comprising,
    a fixed bracket,
    a retainer non-rotatably connected to said bracket,
    a movable bracket,
    a cover non-rotatably connected to said movable bracket and having a depending skirt,
    spring means under said cover and having a radially yieldable connection with the inside of said skirt,
    means fixing said spring means relative to said retainer,
    and means for disconnecting said spring means from said retainer to permit adjustment of said spring means relative to said retainer.

2. A mirror support according to claim 1 in which the inside of said skirt has a plurality of axial grooves angularly spaced about the interior of said cover,
    and said spring means is engageable with any of said grooves.

3. A mirror support according to claim 2 in which said grooves are arranged in diametrically opposed pairs,
    and said spring means has two diametrically opposed groove engaging members.

4. A mirror support according to claim 3 in which said means for fixing and disconnecting said spring means and said retainer comprises, drive means on said spring means, drive means on said retainer, said drive means being responsive to axial movement of both drive means towards each other to prevent relative rotation and being responsive to separation of said drive means to allow relative rotation.

5. A rear view mirror bracket support incorporating a detent position, comprising,
    an inverted cup-like cover having opposed pairs of grooves inside of the side wall of said cover,
    a moving bracket having an end fixed to said cover,
    a spring member having radially flexible spring,
    means engageable with said grooves inside the side wall of said cover and movable inwardly out of such engagement,
    a fixed bracket,
    a retainer mounted on said fixed bracket,
    a bolt passing through said cover and said spring means and said retainer and providing a rotation axis,
    means for fixing said spring member relative to said retainer,
    and means for disabling said fixing means to permit movement of said spring relative to said retainer.

6. A rear view mirror support comprising,
    a cover member having an inverted cup-like configuration including a depending skirt,
    a plurality of diametrically opposed detent recesses spaced about the inside of said skirt,
    a detent member having means biased radially into engagement with said inside of said skirt and said recesses,
    a first bracket connected to said cover member,
    a second bracket,
    one of said brackets being stationary and the other being movable,
    and means for connecting or disconnecting said detent member and said second bracket.

* * * * *